May 25, 1971          D. M. HALEY          3,579,700
CAR WASHING APPARATUS
Filed Aug. 1, 1969          4 Sheets-Sheet 1
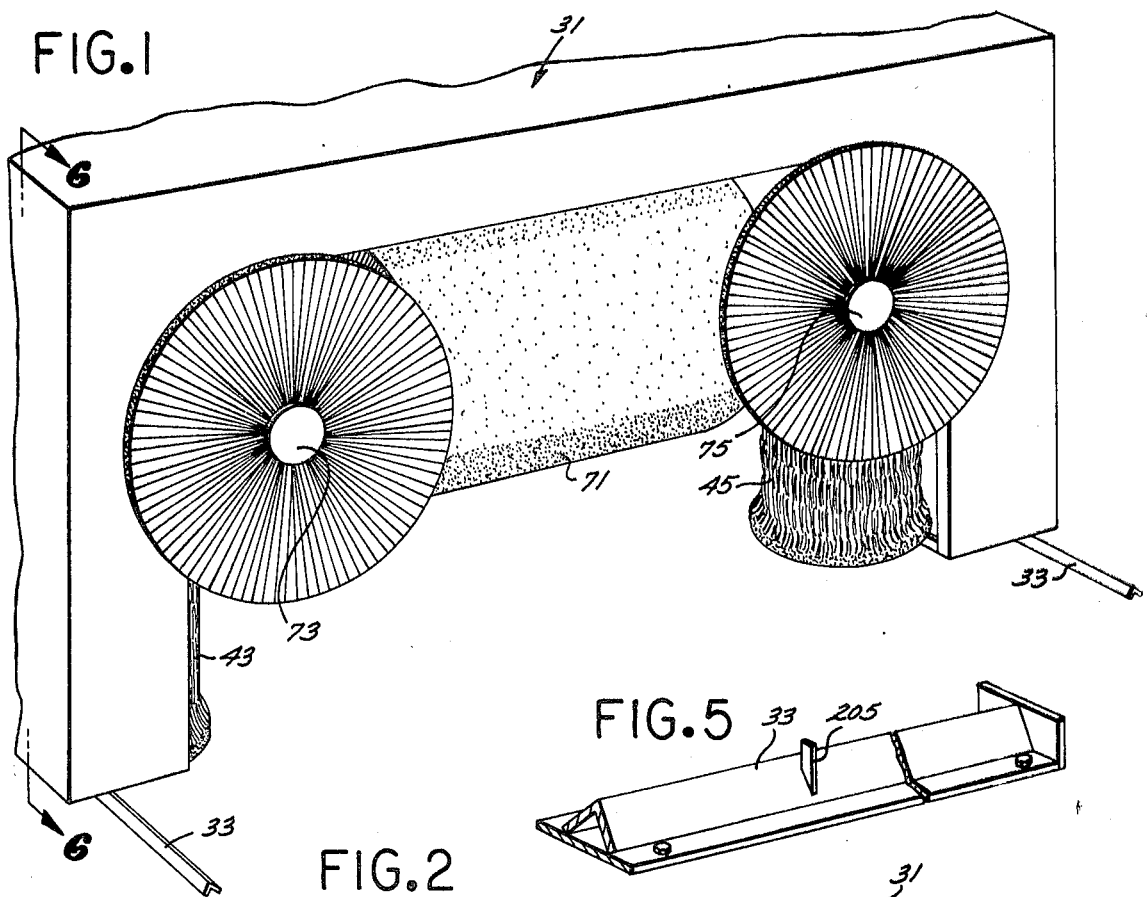
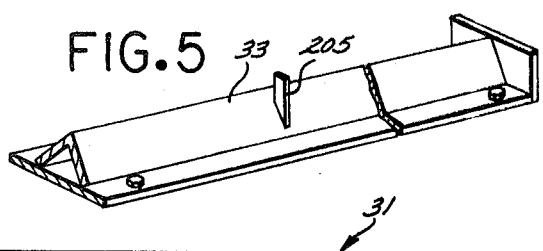
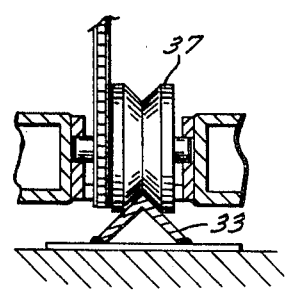
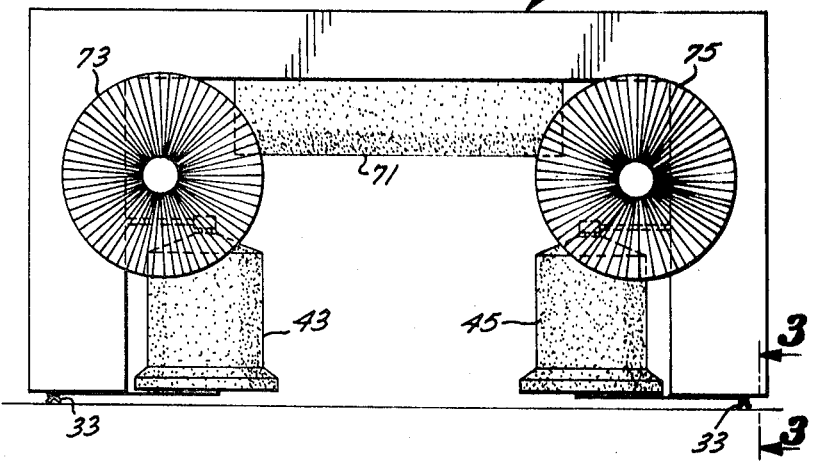
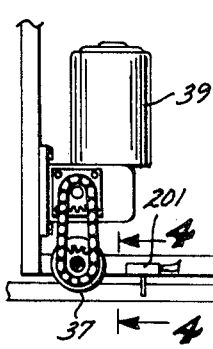
INVENTOR.
DAVID MERL HALEY
BY Fulwider, Patton, Rieber, Lee and Utecht
ATTORNEYS

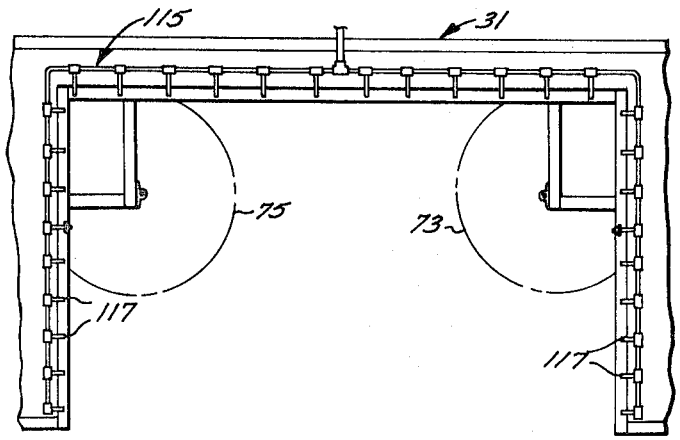
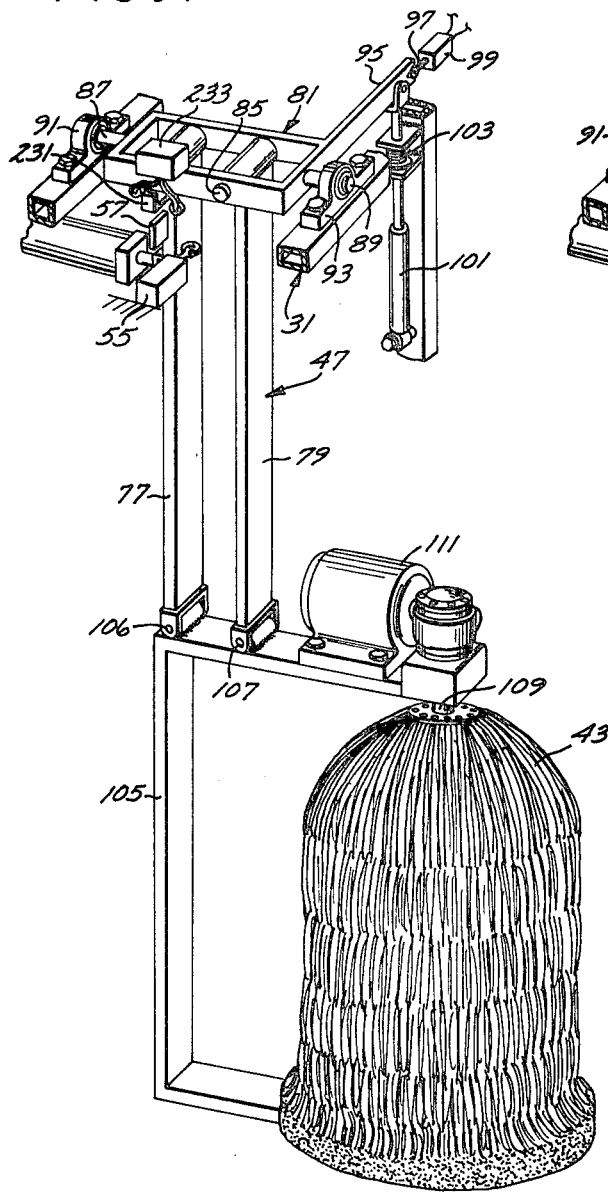
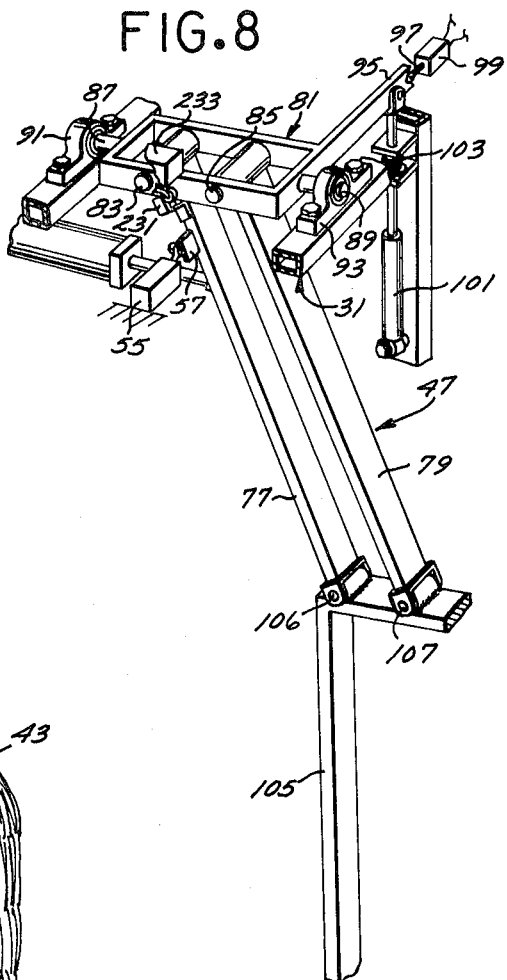

INVENTOR.
DAVID MERL HALEY

ATTORNEYS

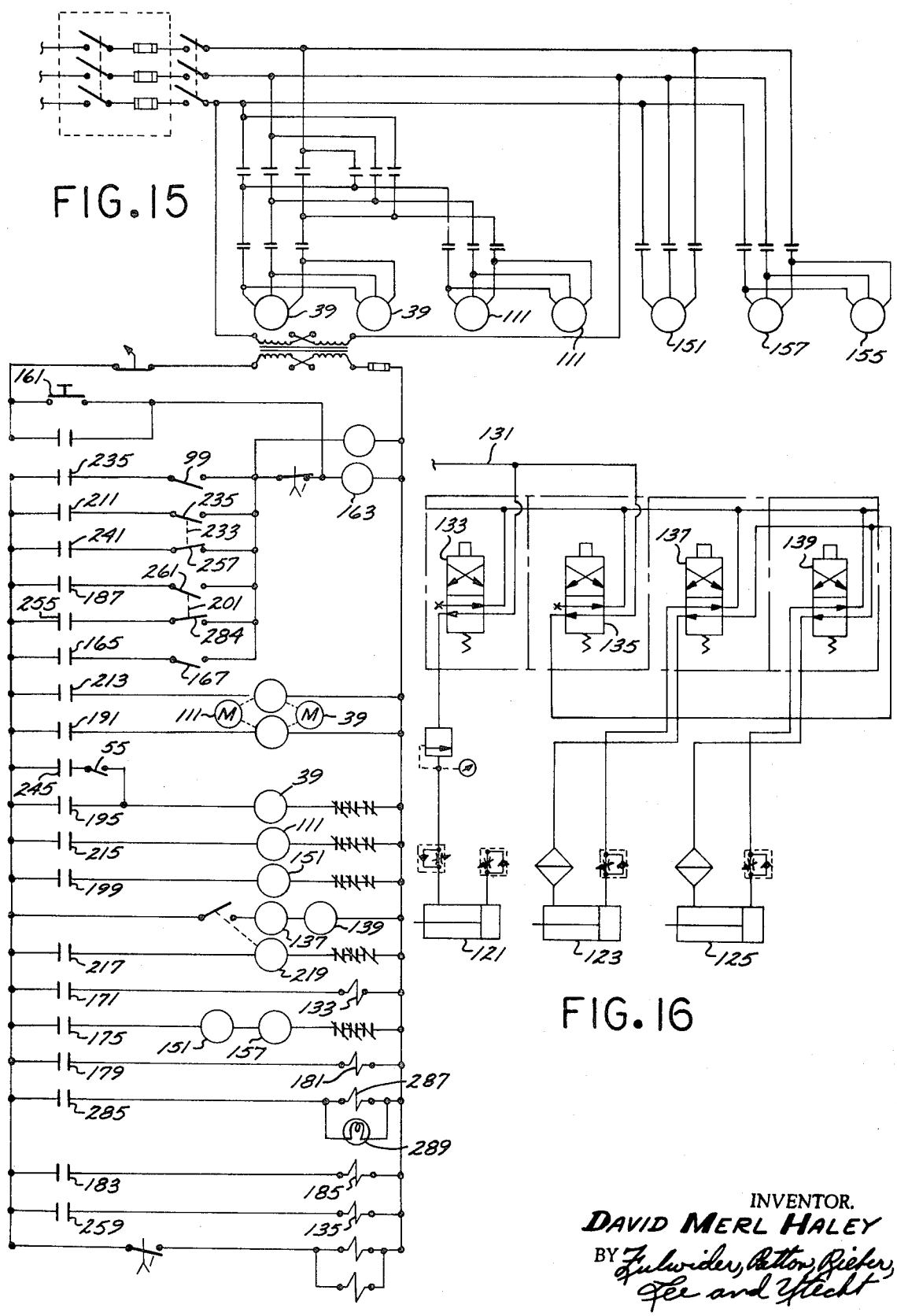

United States Patent Office 3,579,700
Patented May 25, 1971

3,579,700
CAR WASHING APPARATUS
David Merl Haley, Glendale, Calif., assignor to California
Car Wash Systems, Inc., Sun Valley, Calif.
Filed Aug. 1, 1969, Ser. No. 846,851
Int. Cl. B60s 3/06
U.S. Cl. 15—21                           4 Claims

ABSTRACT OF THE DISCLOSURE

Car washing apparatus including a moveable frame to be advanced over a stationary car. A pair of vertically disposed side brushes are carried from the frame and control means are provided for selectively moving the brushes transversely across the ends of the car and for holding them at the respective sides of the car while the frame is moved longitudinally thereof. A safety control is responsive to such brushes engaging projections at the end of the car during their transverse travel to cause the frame to back away from the car and move the brushes clear of the projections so they can continue their transverse travel.

BACKGROUND OF THE INVENTION

Field of the invention

The present invention relates generally to a car washing apparatus and more particularly to a car washing apparatus of the roll-over type for washing a car while such car remains stationary.

Description of the prior art

Car washing apparatuses have been proposed which include a frame that mounts vertical brushes for transverse movement to wash the opposite ends of the car and wherein the frame is moved longitudinally of the car to move the brushes along the respective sides thereof. A car washing apparatus of this type is shown in U.S. Pat. No. 3,304,565. A particular shortcoming of car washing apparatuses of this type is that the brushes in their transverse travel across the ends of certain model cars encounter projections and hang up thereon thereby stopping the washing operation and frequently damaging the apparatus.

SUMMARY OF THE INVENTION

The present invention is characterized by a frame which is moveable forwardly and rearwardly with respect to a parked car and carries a pair of brushes at the sides of the car for selective movement inwardly to wash the front and rear of the car and to be maintained stationed at the respective sides of the car while the frame is driven forwardly or rearwardly with respect thereto. A safety device is connected with the means for driving the frame and is responsive to either one of the brushes hanging upon a protuberance at the end of the car to cause the drive means to be reversed to drive the frame away from the car to disengage the brush from the protuberance to enable continued washing of the car.

Objects and the advantages of the present invention will become apparent from a consideration of the following detailed description when taken in conjunction with the accompanying drawings.

DESCRIPTION OF THE DRAWINGS

FIG. 1 is a perspective view of a car washing apparatus embodying the present invention;

FIG. 2 is a front elevational view, in reduced scale, of the car washing apparatus shown in FIG. 1;

FIG. 3 is a vertical sectional view, in enlarged scale, taken along the line 3—3 of FIG. 2;

FIG. 4 is a vertical sectional view, in enlarged scale, taken along the line 4—4 of FIG. 3;

FIG. 5 is a partial perspective view, in enlarged scale, of a track included in the car washing apparatus shown in FIG. 1;

FIG. 6 is a vertical sectional view, in reduced scale, taken along the line 6—6 of FIG. 1;

FIG. 7 is a perspective view, in enlarged scale, of one of the vertical brushes included in the car washing apparatus shown in FIG. 1;

FIG. 8 is a partial perspective view of the brush support shown in FIG. 7;

FIG. 15 is a schematic view of an electrical control system that may be utilized with the car washing apparatus shown in FIG. 1; and FIG. 16 is a schematic view of a hydraulic system that may be utilized with the car washing apparatus shown in FIG. 1.

DESCRIPTION OF THE PREFERRED EMBODIMENT

Figure 9:
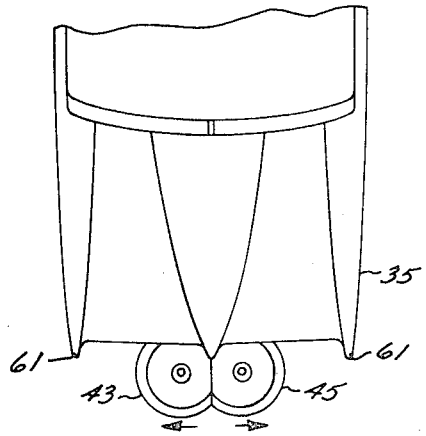
FIGS. 9 through 14 are diagrammatic top views, in reduced scale, of the front end of a car being washed by the car washing apparatus shown in FIG. 1.

The car washing apparatus of present invention includes an inverted U-shaped frame, generally designated 31, which is carried on longitudinal tracks 33 by two pairs of support wheels 37 whereby such frame may be moved longitudinally over a car 35 (FIG. 10) to be washed. Referring to FIG. 3, one of the support wheels 37 on each side of the frame 31 is driven by a respective drive motor 39 to move the frame 31 forwardly and rearwardly on the tracks 33. A pair of vertically oriented brushes 43 and 45 are suspended from each side of the frame 31 by means of respective parallelogram linkages 47. The linkages 47 are controlled by hydraulic cylinders 49 to move the brushes 43 and 45 inwardly to a central position (FIG. 10) to be brought into contact with the front of the car 35 and to then be moved outwardly to the respective sides of such car (FIG. 15) for washing such sides as the frame 31 is moved rearwardly therealong.

Figure 13:
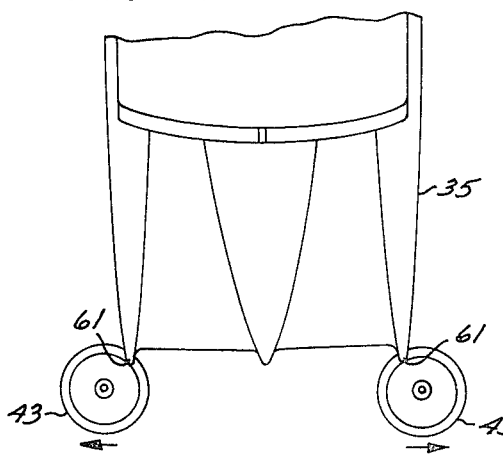
Figure 14:
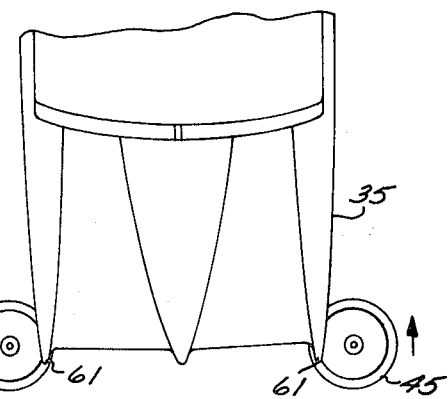

Referring to FIGS. 7 and 8, a safety switch 55 is supported adjacent one of the linkages 47 for reversing the drive motors 39 whenever one of the brushes 43 or 45 hangs up on the front or rear of the car 35. An actuating tab 57 projects from the linkage 47 and engages the actuator of the switch 55 each time the linkages moves the brush 43 outwardly across the front of the automobile 35, thereby momentarily reversing the motors 39. Normally the motors will only be momentarily reversed and will effect no substantial reverse travel of the frame 31. However, if the brushes 43 and 45 encounter forwardly projecting protuberances 61 on the front of the automobile 35 and are restricted from further transverse travel, the actuating tab 57 will maintain the switch 55 closed and will maintain the drive motors 39 reversed to back the frame 31 away from the car 35 to carry the brushes clear of the car, as shown in FIG. 13, whereby such brushes may continue their transverse travel and move the actuating tab 57 clear of the switch 55 to discontinue reversing of the frame 31 and enable such frame, when such brushes reach the sides of the car, to travel rearwardly over the car 35 to carry the brushes 43 and 45 rearwardly along the sides of the car as shown in FIG. 14.

In addition to the side brushes 43 and 45, the frame 31 supports a top brush 71 which follows the top contour of the car 35 and a pair of horizontally disposed window brushes 73 and 75 which wash the side windows of the car.

Referring to FIG. 7, the linkages 47 are formed by a pair of vertically disposed parallel arms 77 and 79 which are carried from a pivotal mount, generally designated 81, by means of respective pivot pins 83 and 85. The pivotal mount 81 includes oppositely projecting, transverse pivot shafts 87 and 89 which are journaled in respective pillow blocks 91 and 93 supported from the frame 31. A lever arm 95 projects rearwardly from the pivot mount 81 and is formed on its rear extremity with a V-notch 97 for receipt of the actuator of a micro-switch 99 that effects control of the apparatus in response to engagement of the brushes 43 and 45 with either the front or rear of the car 35. A shock absorber 101 has its plunger connected with the free end of the lever arm 95 and a coil compression spring 103 is coupled with such plunger to bias the pivotal mount 81 to a neutral position suspending the linkages 47 in a generally vertical plane.

Inwardly opening, vertically disposed, C-shaped frames 105 are supported from the respective parallel arms 77 and 79 by means of pivot pins 106 and 107. The respective brushes 43 and 45 are supported from the respective yokes 105 by means of vertical shafts 109 which are driven by respective motors 111.

Referring to FIG. 6, a spray manifold, generally designated 115, is mounted in the frame 31 and includes a plurality of inwardly directed nozzles 117 for selectively spraying an automobile 35 to be washed with detergent and rinse water.

Referring to FIGS. 7 and 16, a fluid cylinder 121 is provided for selectively retracting the top brush 71 and a pair of fluid cylinders 123 and 125 are provided for controlling the linkages 47 to selectively position the respective brushes 43 and 45. A pressure supply line 131 provides pressure to operate the cylinders 121, 123 and 125 and is connected with the inlet of a solenoid valve 133 which controls pressure to the cylinder 121 and with the inlet of a master solenoid valve 135 which controls pressure to a pair of solenoids 137 and 139 which, in turn, control pressure to the cylinders 123 and 125 for the brushes 43 and 45.

Referring to FIG. 15, the control system for the car washing apparatus of present invention includes respective starters for controlling a motor 151 for rotating the top brush and for controlling motors 153 and 155 for rotating the window brushes 73 and 75.

In operation, the frame is normally disposed in a waiting position at the front of the automobile 35 to be washed. The apparatus is started by depressing a start button 161 which advances a thirteen (13) position step switch 163 to its first position to close the top brush limit switch 165 which is connected in series with a micro-switch 167 disposed adjacent the frame which supports the top brush 71 for being closed upon lowering of such top brush. The first position of the step switch 163 also closes the top brush limit switch 171 to energize the solenoid valve 133 to vent the top brush cylinder 121 (FIG. 16) to enable the top brush 71 to lower. Likewise, the limit switch 175 in series with the window brush motors 151 and 157 is closed to energize such motors. This first position of the step switch 163 further closes limit switches 179 and 183 to actuate the respective water and detergent solenoid valves 181 and 185 to provide a water-detergent mixture to the spray manifold 115.

During lowering of the frames that support the top brush 71 the top brush limit switch 167 is engaged and closed to advance the step switch 163 to its second position to close a rear stop limit switch 187, reversing switch 191, drive switch 195 in series with the drive motors 39, and top brush drive motor 199, while maintaining the above-mentioned switches 171, 175, 179 and 183 closed.

The drive motors 39 will thus drive the frame 31 rearwardly on the tracks 33 to pass the top brush 71 over the top of the car and cause the window brushes 73 and 75 to wash the windows thereof. When the frame 31 reaches the rearward end of its travel, a double-acting switch 201 (FIGS. 3 and 15) carried on such frame 31 will contact a stop 205 (FIG. 5) projecting from the track to close such switch and advance the step switch 163 to its third position. With the step switch 163 in its third position the top brush limit switch 167 and water and detergent solenoids 181 and 185, respectively, are closed and all other switches are opened to thereby stop brush rotation while retracting the top brush and continuing the water and detergent spray. As the top brush 71 is retracted, the top brush limit switch 167 is closed to thereby advance the step switch 163 to its fourth position. In its fourth position the step switch 163 closes a side brush actuating switch 211 forward travel switch 213, side brush motor switch 215, side brush extension switch 217 while maintaining the water and detergent solenoids 181 and switches 179 and 183 closed. Closure of side brush control switch 217 energizes time delay 219 to, after a predetermined period, close time delay switch 221 to thereafter energize the side brush solenoid valves 137 and 139 to pressurize the cylinders 123 and 125 and move the side brushes 43 and 45 to their central positions shown in FIG. 9.

Referring to FIG. 7, inward movement of the brushes 43 and 45 will cause an actuating tab 231 affixed to the parallel arm 77 to engage one arm of a double-acting switch 233 to close the contacts 235 (FIG. 15) to thereby advance the step switch 163 to its fifth position wherein the following switches are closed; forward and rear limit switch 235, forward travel switch 213, wheel drive 195, side brush motor switch 215, side brush control switch 217, and water and detergent solenoid switches 179 and 183. The brushes 43 and 45 will thus be centrally disposed and the frame 31 will be moved forwardly until such brushes engage the rear of the automobile. When the brushes 43 and 45 engage the rear of the automobile, the pivot mount 81 will be pivoted slightly to close the switch 99 and advance the step switch 163 to its sixth position.

In its sixth position the step switch 163 maintains the following switches closed; a brush out limit switch 241, reversing switch 191, side brush motor switch 215, water and detergent solenoids 199 and 217, and a safety return switch 245 connected in parallel with the wheel drive motor switch 195. The remaining switches drop open thereby opening the circuit to the drive motors 39 and reversing the direction of rotation of the brushes 43 and 45 and retracting such brushes into the legs of the frame 31.

When the side brushes 43 and 45 reach their retracted positions, the actuator tab 231 carried on the parallel arm 77 will actuate the switch 233 closing the contacts 251 to advance the step switch 163 to its seventh position wherein the following switches are closed; front stop limit switch 255, forward drive and side brush switch 213, drive motor switch 195, side brush motor switch 215, side brush extension switch 217, window brush switch 175, water and detergent solenoid switches 179 and 183, respectively, and master side brush control switch 259. The side brushes 43 and 45 are thus suspended freely at the sides of the car and the frame 31 is moved forwardly toward the front of the car until the drive control limit switch 201 contacts a stop (not shown) at the front of the tracks 33 to close the contacts 261 in the switch 201 to advance the step switch 163 to its eighth position and close the following switches; side brush limit switch 211, reversing switch 191, side brush drive switches 215, side brush extension switch 217, and water and detergent solenoids 179 and 183. Thus, the side brushes 43 and 45 are extended to their central position shown in FIG. 9 and are rotated in the direction shown by the directional arrows. The switch 233 will be moved to close the contacts 251 to thereby advance the step switch 163 to its ninth position thereby closing the following switches; travel limit switch 235, reverse drive and side brush reverse switch 191, drive motor switch 195, side brush motor switch 215, side brush extension switch 217, and water and detergent solenoids 179 and 183. The frame 31 will thus be moved rearwardly until the brushes 43 and 45 contact the front of the car shown in FIG. 9 thereby pivoting the pivotal mount 81 and lowering the lever arm 95 to close the switch 99 and advance the step switch 163 to its tenth position wherein the following switches are closed; side brush out limit switch 241, forward drive and side brush switch 213, side brush drive switch 215, water solenoid 179, and safety return limit switch 245.

Figure 10:
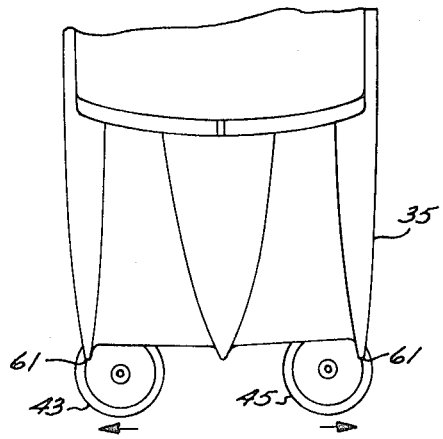
Figure 11:
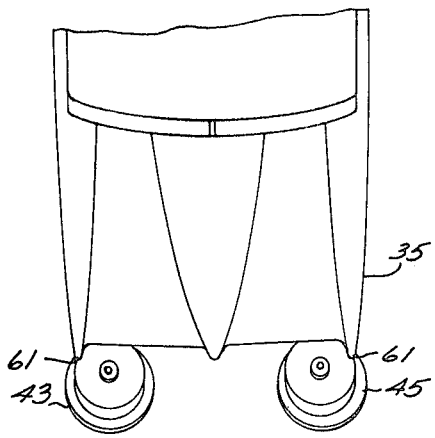
Figure 12:
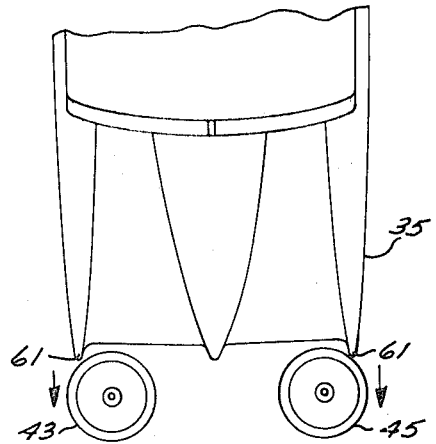

The side brushes 43 and 45 are thus moved outwardly across the front of the car as shown in FIG. 10 and the tab 57 carried on the parallel arm 77 engages the switch 55 and closes it momentarily. Should, however, the brushes catch on the forwardly projecting protuberances 61 defined by the front extremity of the car fenders, the switch 55 would be held closed to thereby actuate the motors 39 with the switch 191 closed to reverse travel of the frame 31 sufficiently for the brushes 43 and 45 to clear the protuberances and move outwardly as shown in FIG. 13. When the brushes reach their outer positions, the switch 233 will be moved to its position closing contacts 251 to thereby advance the stepping switch 163 to its eleventh position to close the following switches; rear limit switch 187, reverse drive and side brush reverse switch 191, drive motor 195, and water solenoid 179. The frame 31 thus travels rearwardly over the car with the brushes 43 and 45 retracted and non-operative to rinse the car 35.

When the stop 205 at the rear of the track 33 is reached, the reversing switch 201 will be repositioned to close the contacts 284 and advance the step switch 163 to its twelfth position closing the following switches; front stop switch 255, forward drive and side brush switch 213, drive switch 195, water and wax solenoids 179 and 285 to thereby actuate a wax control valve 287 and a parallel connected indicator light 289. The frame 31 will then move forwardly over the car spraying the car with a mixture of water and wax and when it reaches the front of the tracks 33, the travel switch 201 will contact a stop and close the contacts 261 to advance the step switch 163 to its thirteenth position in preparation for a new cycle.

From the foregoing, it will be apparent that the car washing apparatus of present invention provides an economical and convenient means for washing an automobile and requires a relatively small space for installation thereof. The apparatus provides means to enable washing of an automobile having protuberances on the ends thereof without danger of the side brushes hanging up on such protuberances and causing damage to the equipment or automobile.

Various modifications and changes may be made with regard to the foregoing detailed description without departing from the spirit of the invention.

I claim:
1. Car washing apparatus comprising:
   a track extending along a car bay;
   a frame supported on wheels riding on said track;
   drive means for selectively driving said frame in opposite directions on said track;
   a pair of vertically disposed brushes for washing the sides and, at least, one end of said car;
   support arms for supporting said brushes from said frame for transverse movement across said one end of said car and to hold said brushes against the respective sides of said car while said frame is driven longtitudinally thereby;
   power-operated means interposed between said frame and said support arms that selectively moves said brushes into position centrally of said frame and to the side of said car;
   control means for controlling said drive means and arm extension means;
   safety means coupled with said drive means and responsive to said brushes engaging a protuberance on said one end of said car to reverse said drive means and back said frame away from said one end of said car to carry said brushes clear of said protuberance and enable said brushes to continue traveling across said one end.

2. Car washing apparatus as set forth in claim 1 wherein: said safety means includes an electrical switch having its actuator disposed in the path of one of said arms and said safety means is responsive to said switch being held closed for a predetermined time to reverse said drive means and move said frame to carry said brushes clear of said protuberance.

3. Car washing apparatus as set forth in claim 1 wherein:
   said control means includes means responsive to said brushes being moved into contact with said one end of said car for rendering said drive motor inoperable and said drive motor is an electric motor; and
   said safety means includes switch means responsive to said brushes being moved into contact with said one end of said car to reverse the circuit to said motor and a safety switch having an actuator projecting into the path of one of said arms and said motor is responsive to said safety switch being closed for a predetermined time to move said frame in its reverse direction to carry said brush clear of said protuberance.

4. Car washing apparatus as set forth in claim 1 wherein:
   said frame extends above the height of a car to be washed;
   said support arms form a vertically disposed parallelogram pivotally supported on its upper extremity from said frame; and
   said safety means includes a switch for controlling said drive motor and disposed adjacent the upper extremity of said arms and, an actuating tab for closing said switch as said brushes are moved transversely outwardly across the end of said car and arranged to hold said switch closed when said brushes engage an are stopped by said protuberances.

References Cited
UNITED STATES PATENTS

| | | | |
|---|---|---|---|
| 3,304,565 | 2/1967 | Fuhring | 15—21(E) |
| 3,428,983 | 2/1969 | Seakan | 15—21(E) |

EDWARD L. ROBERTS, Primary Examiner